United States Patent
Snell et al.

(10) Patent No.: US 6,801,550 B1
(45) Date of Patent: Oct. 5, 2004

(54) MULTIPLE EMITTER SIDE PUMPING METHOD AND APPARATUS FOR FIBER LASERS

(75) Inventors: Kevin J. Snell, Chelmsford, MA (US); Scott D. Setzler, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/449,934

(22) Filed: May 30, 2003

(51) Int. Cl.[7] .............. H01S 3/30; H01S 3/09; G02B 6/26
(52) U.S. Cl. .............. 372/6; 372/69; 385/27
(58) Field of Search .............. 372/6, 38.06, 69; 385/27–31, 43

(56) References Cited

U.S. PATENT DOCUMENTS

| | | | | |
|---|---|---|---|---|
| 6,256,327 B1 | * | 7/2001 | Goldberg ................. | 372/22 |
| 6,603,791 B2 | * | 8/2003 | Goldberg et al. ......... | 372/81 |
| 6,608,951 B1 | * | 8/2003 | Goldberg et al. ......... | 385/43 |
| 6,717,720 B2 | * | 4/2004 | Goldberg et al. ......... | 359/341.3 |
| 6,731,837 B2 | * | 5/2004 | Goldberg et al. ......... | 385/27 |
| 2002/0094159 A1 | * | 7/2002 | Goldberg et al. ......... | 385/27 |
| 2002/0118918 A1 | * | 8/2002 | Goldberg ................. | 385/31 |
| 2002/0136505 A1 | * | 9/2002 | Goldberg et al. ......... | 385/92 |
| 2002/0168139 A1 | * | 11/2002 | Clarkson et al. ......... | 385/27 |

* cited by examiner

*Primary Examiner*—Don Wong
*Assistant Examiner*—Phillip Nguyen
(74) *Attorney, Agent, or Firm*—Robert K. Tendler; Daniel J. Long

(57) ABSTRACT

A modified V-groove structure in a double clad laser system permits multiple emitter side pumping of a fiber laser. In one embodiment, a stack of at least five emitters have individual outputs coupled into the inner cladding, with as many sources as desired coupled to the fiber to raise the cumulative pumping power to in excess of 2-KW, thus to achieve a 1-KW fiber laser.

20 Claims, 7 Drawing Sheets

MULTIPLE EMITTER SIDE PUMPING METHOD AND APPARATUS FOR FIBER LASERS

FIELD OF INVENTION

This invention relates to high power fiber lasers and more particularly to a method and apparatus for pumping the fiber laser.

BACKGROUND OF THE INVENTION

Fiber lasers exhibit great potential for applications as high power directed energy sources. Fiber lasers offer the advantages of high efficiency, minimal cooling requirements, and good beam quality. However, the main problem with fiber lasers is obtaining high power out of a fiber because it requires a significant amount of pumping power. Even with the larger cores available through the use of a double clad system, it is still only with difficulty that one can get a few hundred watts of pump light into the end of a fiber. For 1-KW applications one needs at least 2 to 4 KW of laser pump power. How to obtain such high pump power for solid-state lasers has proved to be a problem.

Recent laser demonstrations of Yb doped fibers have shown the power scaling capability of fiber lasers with >100W single mode output and beam quality of $M^2 \cong 1.1$. However power scaling beyond the 200W level is severely limited by current fiber and diode pump coupling technology of end-pumped, single-mode double clad Yb:fiber lasers. Step-index, single mode Yb:fiber lasers operating around 1 $\mu$m are limited to about a 200 W power level due to the onset of non-linear optical effects that lead to damage of the fiber core as well as defect related damage at the high CW intensities encountered (>>100 MW/cm$^2$). Pump power coupled into the two ends of a double clad fiber laser is limited to about 500 W, employing the brightest currently available laser diode arrays. Even with the high efficiency (50–60%) of an Yb:fiber laser this would result in a maximum fiber laser output of only 250–300 W.

Advances in side coupling to fibers now permit the coupling of multiple discrete emitters to a fiber. However at the pump powers required for a 1-KW laser this would represent greater than 1000 individual diode packages and pump fibers, resulting in a very complex system.

What is required is a 1-KW fiber laser generating a single mode, polarizing preserving output using a longer operating wavelength to achieve a diffraction-limited output. Furthermore, one needs to dramatically reduce the complexity of ultra-high-power fiber lasers.

By way of further background, fiber lasers show great promise as efficient high power continuous wave laser sources. They are highly efficient due a combination of low loss and long interaction length. They can produce diffraction-limited single mode outputs, have a very high surface to volume ratio to efficiently dissipate heat and can use all-fiber couplers and reflectors developed for telecom applications to achieve monolithic, alignment-free resonant cavities.

The highest power yet reported is 110 W from a CW Yb:fiber laser operating in a near-diffraction limited spatial mode with an optical efficiency of 58% and a wall plug electrical-to-optical efficiency of >20%. Work in progress has demonstrated greater than 200 W single-mode CW output with prospects for 300–500 W in multimode operation. In pulsed operation, 64-KW peak power with 51.2 W average power was generated by amplifying 10 ps 1064 nm pulses from a mode-locked Nd:YVO$_4$ laser in a large mode area (LMA) Yb:fiber amplifier.

However, several important limitations exist to scaling the output power of fiber lasers. These include most notables limited pump coupling to the fiber.

Thus, the principal limitation to date has been the coupling of large pump powers into the active regions of a single mode fiber. The advent of double-clad geometry fiber lasers, where the pump light is guided in a second multimode core, led to greatly increased output power. However, the amount of pump power that may be coupled into the end of a double clad fiber is limited by the brightness of the laser diode and the two entry ports. Newer, highly collimated laser diode arrays have achieved coupling of 250 W into a 400 $\mu$m, 0.22 NA fiber which could permit the end-coupling of up to 500 W of pump into the fiber. However this is still several times less power than that required for a 1-KW output.

The other primary limitation to producing high power fiber lasers is the onset of non-linear optical effects. More benign non-linear affects such as Stimulated Raman Scattering (SRS) and Self-phase modulation (SPM) result in spectral broadening. However Stimulated Brillouin Scattering (SBS) can lead to self-Q switching of the fiber which in turn can damage the fiber due to high intensity. The role of thermal effects has not yet been shown theoretically beyond tuning of the laser output with temperature. However, at high average powers, thermal effects may significantly affect laser performance through thermally induced changes in the refractive index profile and thermal population of the terminal laser level in quasi-three lasers such as Yb, Er and Tm. Imperfections in the fiber surface can also lead to damage due to the high CW intensities (>100 MW/cm$^2$ for 100 W output).

Although fiber lasers have numerous advantages over bulk lasers, one of their primary disadvantages is the difficulty of pumping them due to their small dimensions. Hence, to date fiber laser CW power output has been limited by the amount of pump power that can be coupled into the ends of the fiber.

A significant advance in high power fibers lasers was the advent of the double clad fiber structure. The central core region of radius, r, and an index, $n_2$ contains an active laser ion (such as Nd, Yb, Er, or Tm) and is usually sized to support only the fundamental mode. It is surrounded by an inner cladding region of index, no and usually has a polygonal cross-section. This is in turn surrounded by the outer cladding with index, $n_0$. For guiding in each region the indices must meet the condition $n_0 < n_1 < n_2$. The numerical aperture, NA of each region is given by:

$$NA = (n_i^2 - n_j^2)^{1/2}$$

The principle of operation of this structure is that light from low brightness pump sources can be guided in the inner cladding region and can be absorbed by the active core, eliminating the need for high brightness sources to pump directly into the active core. Since the overlap area between the inner cladding and the core is small, then the effective pump absorption, $\alpha_{\textit{eff}}$ is the core absorption coefficient, $\alpha$ reduced by the ratio of the areas:

$$\alpha hd\ eff = \alpha A_{core} / A_{clad}$$

Furthermore if the inner cladding region is circularly symmetric and the core is centered, the absorption is further reduced since only the meridonal rays intersect the core region. The use of a polygonal cladding eliminates skew rays, whereas offsetting the core allows skewed rays to access the core region.

The amount of power that may be coupled into the ends of a double clad fiber laser is determined by the brightness of the pump source and the size and numerical aperture of the inner cladding. The radiance theorem states that in radiance (diameter-NA product) is constant in an optical system expressed as the following relation:

$$D_{out}NA_{out}=D_{in}NA_{in}$$

Currently the best results for fiber coupling of laser diodes is 250 W from a 400 $\mu$m, 0.22 NA fiber. This would be sufficient for coupling into the inner cladding region of a typical double clad fiber (200 $\mu$m, 0.44 NA). Using both ends, up-to 500 W of pump could be coupled. However this is still several times less pump than that required for a 1-KW laser source. Given these limitations, it is clear that in order to scale fiber lasers to kilowatt output powers, a scalable side-coupled pump technique is required.

As to side coupled pumping schemes, there are three potential scalable coupling techniques, presented here in order of increasing risk (i.e., difficulty related to fabrication/implementation). As the risk increases, however, the final system complexity generally decreases. Note that for each technique presented below, each is capable of delivering 20–30W of pump power per tap into a double clad fiber (DCF).

The first method is a side coupled pump scheme which is key for the realization of high power fiber lasers since it permits the coupling of an arbitrary number of pump lasers into the active core of the fiber laser. In this scheme, a multimode pump fiber is fused at a grazing angle into the inner cladding of a double clad fiber laser. Since the angle of the coupling is small, pump light already captured by the inner cladding from another pump region remains within the double clad structure. Discrete 100 $\mu$m broad area emitters are coupled into multimode fiber pigtails which are then fused together and spliced into the multimode fiber taps. The broad area emitters have proven reliability and the use of multiple packages effectively distributes the heat load. However the high package count is too cumbersome for a KW class fiber laser.

The second method is a modification of the above side coupled pump scheme employing commercially available fiber array packages (FAPs) instead of single emitters. Fibers in the FAP are fused together and then fused into the double clad fiber coupler. This is as reliable and efficient as the first method, with fewer parts and less cost. The laser diode heat load is more localized, but this is easily offset by the space saved by using diode bars rather than single emitters.

SUMMARY OF THE INVENTION

A third method, and one which is the subject of this patent, uses a modified V-groove approach to directly couple a stack of at least 5 emitters either directly into the double clad fiber, or into a pigtail that can be fused onto the double clad fiber. In the subject method a number of emitters are coupled to successive V-grooves in the inner cladding of a double clad fiber. The grooves are configured such that all pumping light introduced into the inner cladding is reflected in only one direction down the fiber, with no backwardly reflected radiation. The angles on the facets of the V-grooves are such as to assure total internal reflection. This means that as may sources as desired can be coupled to the fiber so as to raise the cumulative pumping power to in excess of 2-KW. This in turn results in a fiber laser output exceeding 1-KW, useful for industrial as well as military applications. This method dramatically reduces the cost, parts count, and complexity of the system.

Thus, in the subject invention, a diode array modified V-groove coupling is used so that multiple emitters can be arrayed along a fiber to provide the required pumping power.

This is a direct diode-coupling scheme based on V-groove side-pumping geometry. In the subject invention, a modified V-groove technology allows the direct side coupling of several emitters within a several millimeter length of fiber, whereas conventional V-groove technology permits only one emitter to be coupled per absorption length of fiber, about 2 meters given an absorption coefficient of 4.6 dB/m. As such, the pump density using conventional V-groove coupling is significantly lower. In one embodiment, a longer operating wavelength is obtained by using thulium as the active lasing ion, resulting in tunable laser action from 1.8–2.1 $\mu$m. This high power 2 $\mu$m laser technology has important dual-use applications in IR countermeasures, medicine and materials processing made possible by an efficient and scalable direct side-coupled pump scheme.

What is provided is a scalable high power fiber laser pump module that has a tenfold decrease in complexity over existing side-pumping techniques. This is achieved by the integration of discrete single emitters into custom laser diode bar packages and the use of the subject side-coupled fiber pump technique using a modified "V-groove" structure that permits multiple emitters to be directly coupled into the pump clad region of a double clad fiber laser.

V-groove coupling geometry was first presented by Ripin and Goldberg Elec. Lett., vol. 31, p. 2204 (1995). While slightly modified geometries have been presented as reported by Goldberg, CLEO 2000, p. 572, all rely on the same basic concept. A small region of the double clad fiber is stripped to reveal the inner cladding. A 90° notch is cut into the side of the inner cladding, providing a total internal reflection, TIR, surface for diode light focused onto one side (alpha facet) of the notch. Assuming a refractive index of ~1.5 and an NA of 0.44 for the double-clad portion of the fiber, the critical angle for confinement is 73° with respect to the normal to the fiber surface. Reflection off the notch will only occur if the diode light is incident at an angle of 42° or larger relative to the normal of the notch, assuming that air (n=1) is on the opposite side to the notch. Alternately, light incident on the notch at angles larger than 62° will reflect off the notch but will then be incident on the fiber walls at angles less than the critical angle and will not be confined in the 0.44 NA fiber. Hence, the light cone of the pump laser must be 20° or less, and incident on the notch at an angle of 52° for efficient coupling.

In one embodiment, for V-groove side-pump coupling, a small section of fiber with the outer cladding stripped has a notch, or groove, fixed on the side. Diode light is focused onto this facet and, if properly conditioned the diode light is coupled into the double clad fiber.

Typical V-groove features are about 20–50 $\mu$m deep in fibers with inner cladding diameters of 120–180 $\mu$m. The diode light is typically conditioned so that the fast axis is focused onto the V-groove in a 15° light cone.

While a single V-groove is excellent at coupling pump light into a fiber core, attempting to use multiple V-grooves fails due to light escaping because critical angles are exceeded.

The subject modified V-groove approach avoids problems associated with multiple conventions V-groove. In the subject invention a second groove is successfully placed closely following the first V-groove. If the second groove were also at 45°, it would directly out-couple a significant portion of the pump light from the first V-groove. Instead, a shallow facet, referred to as the beta facet, since it is formed at an angel β with respect to the fiber axis, gradually transitions the fiber between V-grooves to keep the light confined. Since some of the light that comes off the first V-groove referred to as the alpha facet is now incident on the beta facet, it could spoil the NA, numerical aperture, of the pump light. For the two most extreme rays behave under this geometry (assuming the same conditioning of the diode light incident on the V-groove), one ray is −3° off normal to the fiber axis. This results in a 42° angle of incidence at the alpha facet fiber-to-air interface and matches the critical angle for total internal reflection. Another ray is 11° off normal to the fiber axis, with this ray forming the 14° diode-focusing angle. Upon reflection at the alpha facet it is incident on the beta facet at an angle of 79°-β. When the ray then hits the flat side of the fiber, it is well within the required 42° incidence angle for total internal reflection at the fiber-to-air interface. However, in one embodiment, this ray is to be incident at the 73° angle ($\theta_c$) required for total internal reflection in the 0.44 NA fiber. This requirement results in a facet angle of β=3° or less for confinement in the double clad fiber. The beta facet then terminates at a second alpha facet useful for injecting a second pump source.

In this manner any number of sources can inject energy into the inner core and have the energy propagate down the filer without loss due to a subsequent V-notch and without exiting the fiber. Thus enough energy can be pumped into the core to yield a 1-KW output or better.

Note that the addition of a second alpha facet does not increase the NA of the pump light beyond the 0.44 required by the double clad fiber.

Note also that, as will be demonstrated, the addition of four more alpha facets represents a five-fold increase in pump density over conventional V-groove coupling. Assuming 200 μm-wide diode emitters can be coupled with this geometry, approximately ~30W of pump can be delivered to the fiber. This modified V-groove can be applied directly to the double clad fiber or to a pigtail that is then spliced into the fiber laser.

In summary, a modified V-groove structure in a double clad laser system permits multiple emitter side pumping of a fiber laser. In one embodiment, a stack of at least five emitters have individual outputs coupled into the inner cladding, with as many sources as desired coupled to the fiber to raise the cumulative pumping power to in excess of 2-KW, thus to achieve a 1-KW fiber laser.

BRIEF DESCRIPTION OF THE DRAWINGS

These and other features of the subject invention will be better understood in connection with the Detailed Description in conjunction with the Drawings, of which.

DETAILED DESCRIPTION

In the subject system, a 1-KW fiber laser utilizes the aforementioned modified V-groove structure to generate a single mode, polarizing preserving output. In one embodiment, a simple but radical concept of using a longer operating wavelength achieves diffraction-limited output from the ultra-high-power fiber laser. The complexity of ultra-high-power fiber lasers is dramatically reduced through the use of the subject scalable direct side-coupled pump scheme. The longer operating wavelength is obtained by using thulium as the active lasing ion, resulting in tunable laser action from 1.8–2.1 μm. This high power 2 μm laser technology has important dual-use applications in IR countermeasures, medicine and materials processing.

The object of the subject side pumping system is to create a scalable high power fiber laser pump module that has a tenfold decrease in complexity over existing side-pumping techniques. This is achieved by the integration of discrete single emitters into custom laser diode bar packages and the use of the subject modified V-groove structure that permits multiple emitters to be directly coupled into the pump clad region of a double clad fiber laser.

Figure 1:
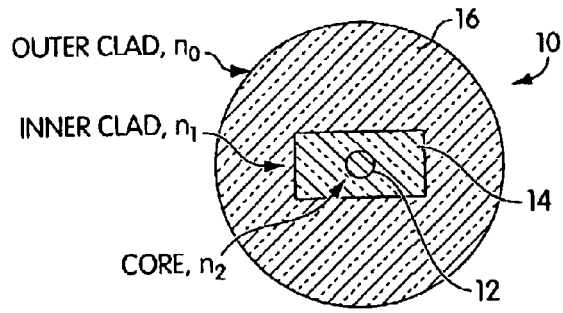
FIG. 1 is a cross sectional view of a double clad fiber for use in, a fiber laser, illustrating a core, an inner cladding and an outer cladding.

As to high power pumping and referring now to FIG. 1, although fiber lasers have numerous advantages over bulk lasers, one of their primary disadvantages is the difficulty of pumping them due to their small dimensions. Hence, to-date fiber laser CW power output has been limited by the amount of pump power that can be coupled into the ends of the fiber.

As can be seen in FIG. 1, in cross-section a double clad fiber 10 has a core 12, a rectilinear inner cladding 14 and a circular cross-sectioned outer cladding 16. Here the core has an index of refraction $n_2$, with the inner core having an index of refraction $n_1$ and an outer cladding having an index of refraction $n_0$.

A significant advance in high power fibers lasers was the advent of this double clad fiber structure. The central core region of radius r and an index, $n_2$ contains the active laser ion (Nd, Yb, Er, Tm etc.) and is usually sized to support only the fundamental mode. It is surrounded by inner cladding region 14 of index, $n_1$ and usually has a polygonal cross-section. This is in turn surrounded by the outer cladding 16 with index, $n_0$. For guiding in each region the indices must meet the condition $n_0 < n_1 < n_2$.

Figure 2:
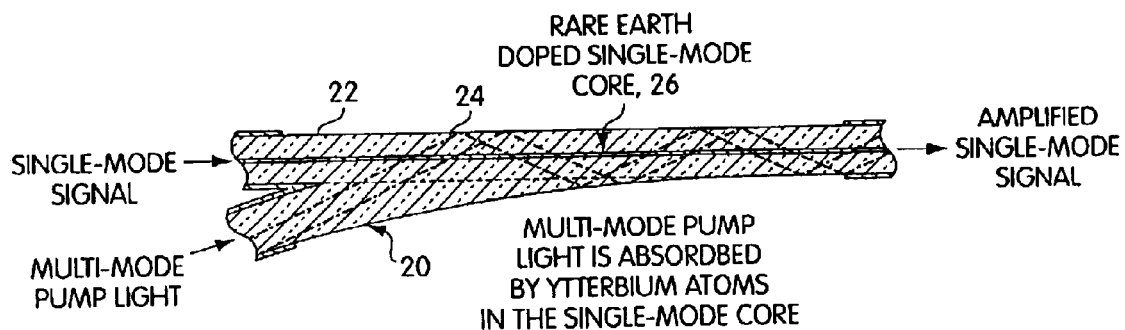
FIG. 2 is a diagrammatic illustration of a prior art side-coupled pumping system in which pump light is coupled into a fiber from the side.

Referring to FIG. 2, a side-coupled pump scheme permits the coupling of an arbitrary number of pump lasers into the active core of the fiber laser. In this scheme, a multimode pump fiber 20 is fused at a grazing angle into the inner cladding 22 of a double clad fiber laser. Since the angle of the coupling is small, pump light 24 already captured by the inner cladding from another pump region remains within the double clad structure. The result is that light propagating down the inner cladding intersects the rare earth doped core 26 over a number of meters which improves pump light absorption.

Figure 3:
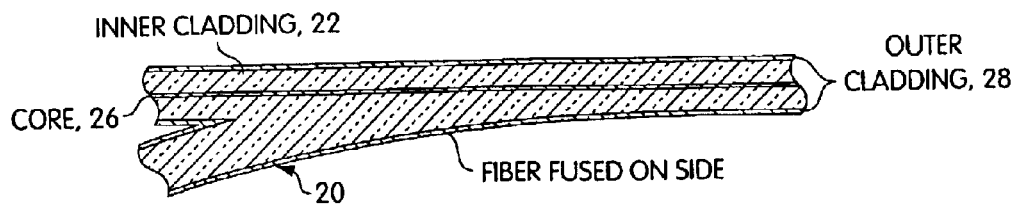
FIG. 3 is a cross sectional view of the side-coupled pumping system of FIG. 2 for a doubly clad fiber, illustrating the transiting of the pumping light about a rare earth doped single mode core, with the pump laser fiber spliced to the inner cladding of the double clad fiber.

As can be seen in FIG. 3, the pump fiber 20 is spliced to inner cladding 22 by a fusing technique. Here shown is outer cladding 28. It is possible to bundle pump fibers together so as to increase pumping power.

However, there are limitations on the number of fibers that can be fused together, and currently 30 W per tap seems to be standard. Although this technique spreads the heat load generated by the diodes over a large area, significantly reducing cooling requirements, this technique drastically increases the package size, part count, and complexity.

Rather than fusing several pigtailed single-emitters together, a fiber array package (FAP) may be used. The FAP is a series of fibers, each directly coupling the light from a bar of several closely spaced emitters (typically 19 1×150 µm emitters in a 1-cm bar). The fibers are then bound in a close-packed bundle and often directly coupled into a large core, high-NA (~800 µm; NA~0.16).

Figure 4:
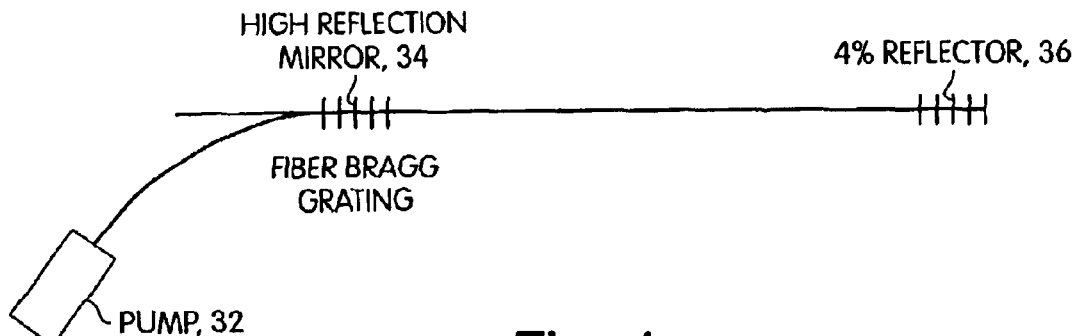
FIG. 4 is a diagrammatic illustration of a side-pumped fiber laser having Bragg gratings forming both the high reflection mirror and the low reflection output coupling for the laser.

As can be seen from FIG. 4, assuming enough pumping power, a fiber laser would include a pumping laser 30 fiber coupled to a fiber 32 which is provided with a high reflection Bragg grating 34 forming one end of a laser cavity. The other end of the laser cavity is formed by another Bragg grating 36 which serves as an output coupler and is only 4% reflective.

In order to pump in enough power, the subject system uses V-groove side-pumping geometry, and a specialized modified V-groove technology to permit the direct side-coupling of several emitters within a several millimeter length of fiber, whereas the conventional V-groove technology permits only one emitter to be coupled per absorption length of fiber, i.e. about 2 meters given an absorption coefficient of 4.6 dB/m. As such, the pump density using conventional V-groove coupling is significantly lower.

Figure 5:
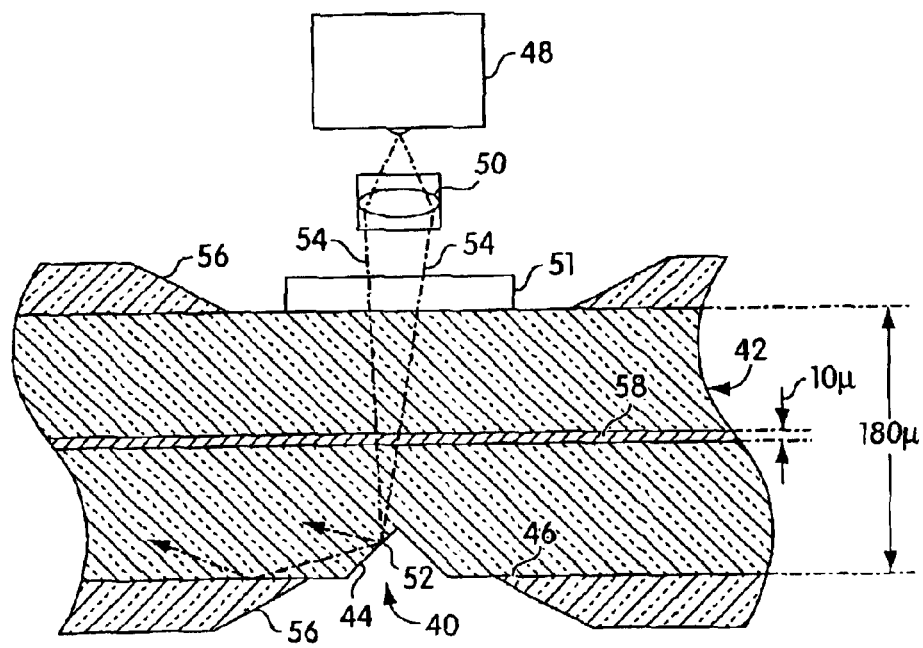
FIG. 5 is a cross sectional view of a prior art Goldberg V-groove side-pumped coupling scheme, illustrating a small section of fiber with outer cladding stripped and provided with a notch or groove to one side of the inner cladding, with diode light coupled into the core from a position opposite the V-groove.

FIG. 5 schematically shows the V-groove coupling geometry as first presented by Ripin and Goldberg Elec. Lett., vol. 31, p. 2204 (1995). While slightly modified geometries have been presented by Goldberg, CLEO 2000, p. 572, all rely on the same basic concept. A small region 40 of the double clad fiber is stripped to reveal the inner cladding 42. A 90° notch 44 is cut into the side 46 of the inner cladding, providing a TIR surface for diode light from a diode 48 focused at 50 through a glass substrate 51 onto one side 52 of the notch called the alpha facet.

Assuming a refractive index of ~1.5 and an NA of 0.44 for the double-clad portion of the fiber, the critical angle for confinement is 73° (with respect to the normal of the fiber surface). Reflection off the notch will only occur if the diode light is incident at an angle of 42° or larger (relative to the normal of the notch), assuming that air (n=1) is on the opposite side of the notch. Alternately, light incident on the notch at angles larger than 62° will reflect off the notch but will then be incident on the fiber walls at angles less than the critical angle and will not be confined in the 0.44 NA fiber. Hence, the light cone 54 of the pump laser must be 20° or less, and incident on the notch at an angle of 52° for efficient coupling. Note that the double clad fiber has an outer cladding 56 and a core 58 doped with the appropriate rare earth element. Here the core has a diameter of 10 µm, with the inner core having a diameter of 180 µm.

Typical V-groove features are about 20–50 µm deep in fibers with inner cladding diameters of 120–180 µm. The diode light is typically conditioned so that the fast axis is focused onto the V-groove in a 15° light cone.

Figure 6:
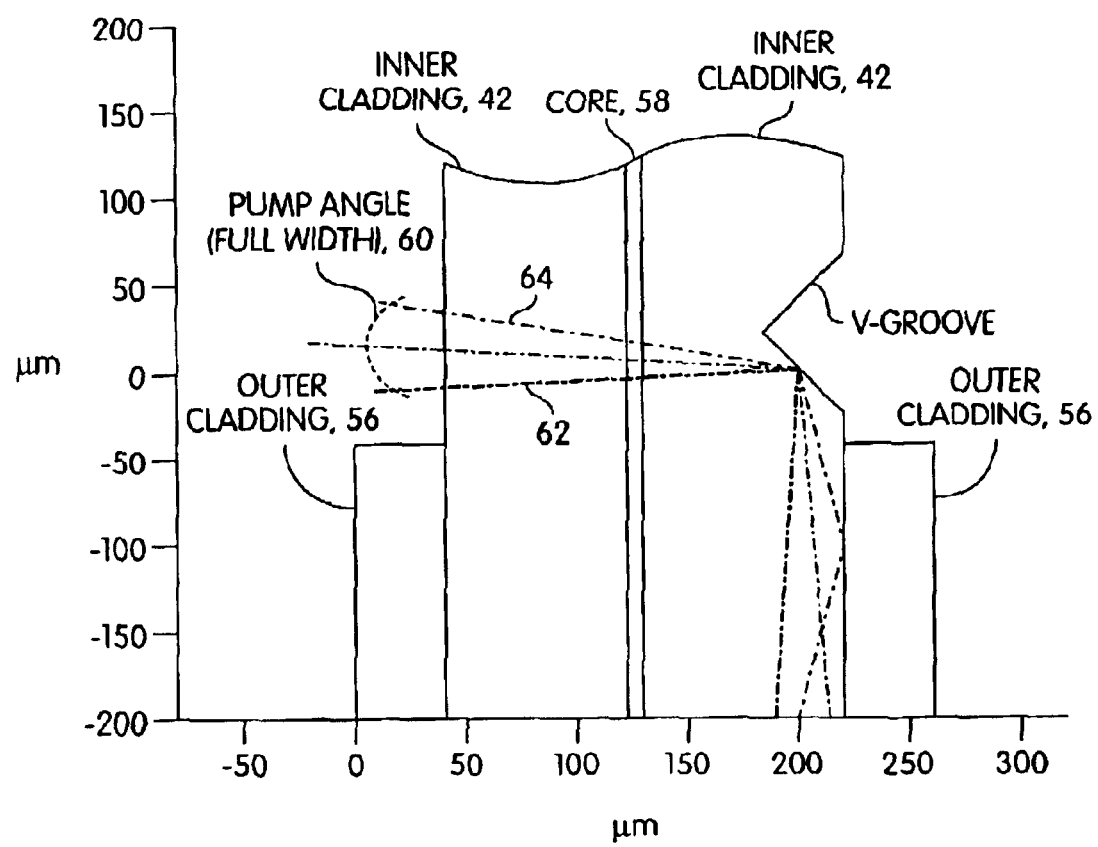
FIG. 6 is a ray diagram for the V-groove side-pumping scheme of FIG. 5 in which one ray corresponding to one side of a focusing cone is incident at less than the 42° glass-to-air critical angle, with another ray to the other side of the focusing cone incident on the sides of the inner cladding.

FIG. 6 shows a ray trace diagram of light coupled via a 40 µm-deep V-groove in a 180 µm core inner cladding. The diode is focused as shown by double ended arrow 60 at 14° (full width) at 42° off normal to the fiber surface. Three rays are shown. Line 62 represents a ray incident at 42° to the face of the groove. Line 64 is incident at 56° to the groove face (the angle between lines 62 and 64 is the full width). The rays represented by line 64 are incident on the side of the fiber at an angle of 78°, well with in the 0.44 NA insuring that all the pump light will be gathered by the fiber.

Figure 7:
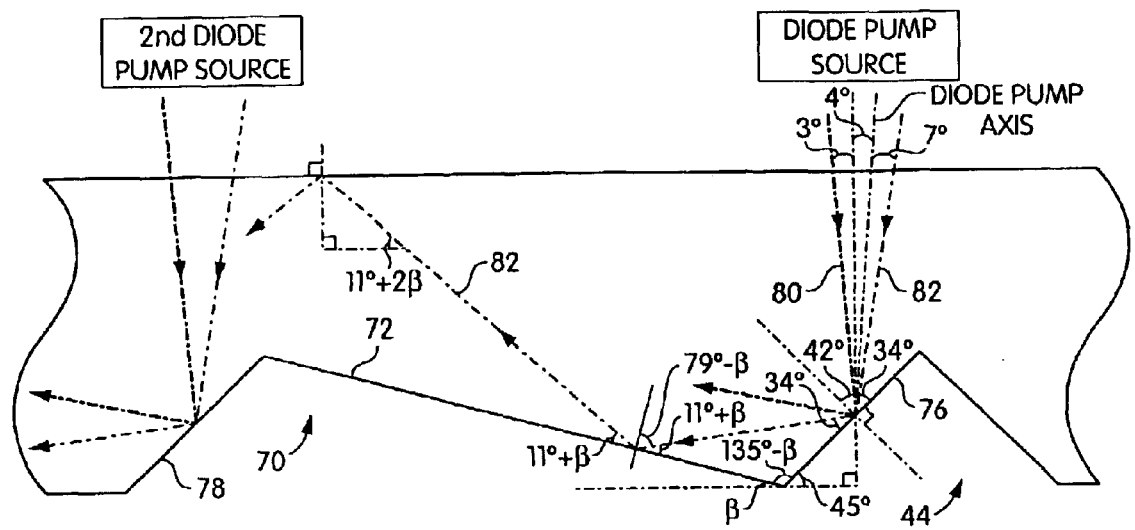
FIG. 7 is a diagrammatic illustration of the subject modified V-groove structure which permits pumping at a number of spaced points along a double clad fiber to achieve pump levels of sufficient power to provide a 1-KW fiber laser, also showing a second V-groove disposed ahead of a first V-groove, with the second V-groove having a rearwardly facing beta facet at a slope angle β from the side of the cladding so as to establish total internal reflection for rays from the alpha facet of the first V-groove.

As can be seen in FIG. 7, the subject modified V-groove incorporates a second groove 70 placed closely following the first V-groove 44. If the second groove were also at 45°, it would directly out-couple a significant portion of the pump light from the first V-groove. Instead, a shallow facet 72 referred to as the beta facet, since it is formed at an angel β with respect to the fiber axis gradually transitions the fiber between V-grooves to keep the light confined. Since some of the light that comes off the alpha facet 76 of V-groove 44 is now incident on beta facet 72, it could spoil the NA of the pump light.

FIG. 7 shows how the two most extreme rays 80 and 82 behave under this geometry, assuming the same conditioning of the diode light incident on the V-groove as before. Ray 80 is −3° off normal to the fiber axis. This results in a 42° angle of incidence at the alpha facet fiber-to-air interface and matches the critical angle for TIR. Ray 82 is 11° off normal to the fiber axis, forming the 14° diode focusing angle. Upon reflection at alpha facet 76 it is incident on beta facet 72 at an angle of 79°-β. When the ray then hits the flat side of the fiber, is well within the required 42° incidence angle for TIR at the fiber-to-air interface. However, one requires it to be incident at the 73° angle ($\theta_c$) required for TIR in the 0.44 NA fiber. This requirement results in a facet angle of $\beta=3°$ or less for confinement in the double clad fiber. The beta facet then terminates at a second alpha facet 78 useful for injecting a second pump source.

A potential issue with this technique is that the light reflecting off the flat fiber surface could again be incident on the beta facet, altering the incidence angle by another 2 $\beta°$ and broadening it beyond the NA of the double clad fiber.

Figure 8:
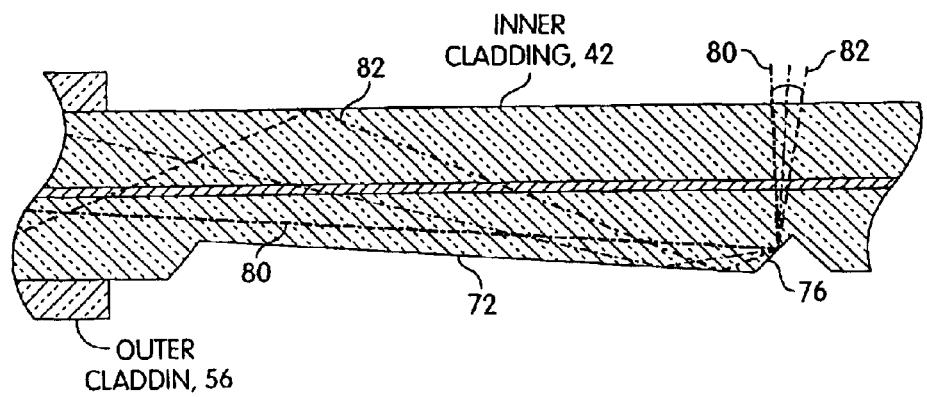
FIG. 8 is a ray trace diagram of light coupled into a double clad fiber via the subject modified V-groove technique, assuming β=3° and a full width pump angle of 15°, showing that the addition of a second V-groove does not result in light out coupling or increase the numerical aperture of the pump light beyond the 0.44 required by the double clad fiber.

FIG. 8 shows the ray trace for a 40 $\mu$m deep alpha facet in a 180 $\mu$m inner clad fiber assuming a 14° diode focusing angle (full width) and a pump incidence angle of 4° with respect to the fiber normal. The steepest rays in the double clad fiber travel well past the second alpha facet before returning to the grooved side of the fiber. As such, the addition of a beta facet still permits the confinement of light in a 0.44 NA fiber and provides a second pump port about 1 mm below the first, as opposed to ~2 m required by conventional V-groove technology.

Figure 9:
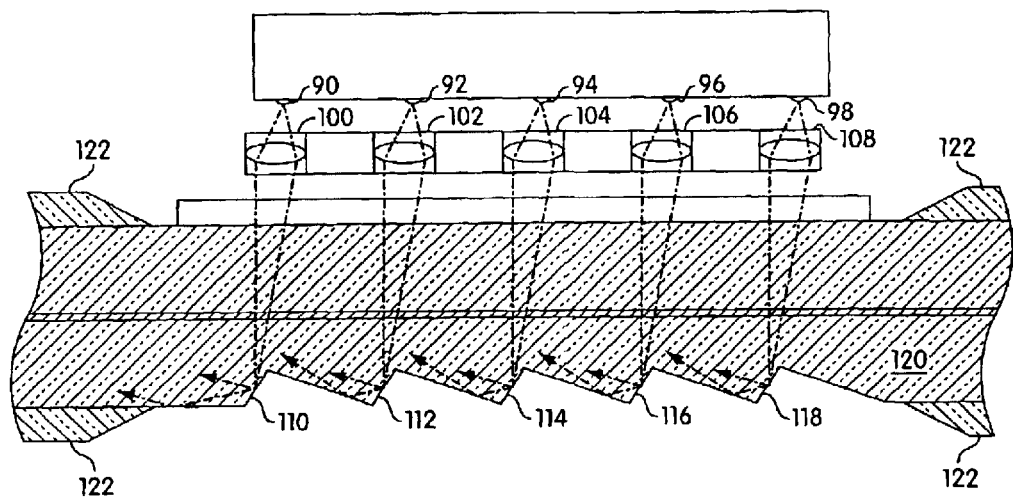
FIG. 9 is a diagrammatic illustration of a five emitter coupling using the subject modified V-groove technique, whereby all of the pumping light adds together to increase pumping power.

Referring to FIG. 9, what is shown is a 5 emitter array, having emitters 90–98 emitting beams focused by optics 100–108 onto V-groove alpha facets 110–118 respectively in an inner cladding 120. Note that inner cladding 120 is surrounded with an outer cladding 122, except where the outer cladding is cut away.

This coupling scheme can be implemented directly into the double clad fiber, or could be performed in a single-clad 0.44 NA fiber that is fused into the double clad fiber, though the first case is expected to be less lousy. It is important to note that the approximate limitation of 5 V-grooves per pump array is not quantitatively rigorous. A few extra grooves could be included, and the benefits they provide with additional pump power easily outweigh the small losses they may present.

The subject V-grooves have stringent requirements. The angles must be exact with a few tenths of a degree, the distances must be as accurate as the diode emitter spacing, and the surfaces must be smooth enough to promote complete reflection. The conventional V-grooves are simple enough to fabricate using mechanical techniques.

A more precise method for insuring high quality surfaces and high precision placement includes the use of a high power, pulsed $CO_2$ laser to micro-machine the structures. The interaction of $CO_2$ laser radiation with glass fibers has been well documented and is readily applied to this application.

The 10.6 $\mu$m $CO_2$ laser radiation is quickly absorbed at the surface of the fiber. If the laser is pulsed with enough energy in a short enough duration, the glass at the surface is vaporized and evaporates away. Excess heat is then conducted into the fiber and carried away. If the pulses are of too long of a duration and too little intensity, they will simply melt the fiber. The depth of melting can be readily calculated as a function of pulse duration for a 25W laser source and determined that pulse durations of 10–20 $\mu$s remove 1–2 $\mu$m of glass. Note that a computer-controlled three-axis translation stage can be used to form the modified V-grooves. Note also that surfaces can be made flat and smooth by exposing the last layer to longer duration, lower intensity pulses to promote a small amount of melting without vaporization.

As to the design of high power fiber lasers, provided there is adequate pump power coupled into the fiber, the principal limitation to producing a high power fiber laser is the onset of non-linear optical effects. Since these non-linear effects are intensity dependent, it is clear that the path to higher power is to increase the area of the mode in the fiber in order to reduce the intensity. However this also leads to excitation of higher order modes and hence degraded beam quality from the fiber laser. In order to preserve the beam quality with larger core sizes, a number of techniques have been developed. These include mode filtering by the use of tapers or bend loss, single mode amplification using carefully fabricated and launched fibers, special large mode area (LMA) guiding structures and combinations of these techniques. An as yet unproven approach may employ photonic crystal fiber (PCF) to realize a LMA structure but the technology of these "holey fibers" is still in its infancy. Each of these techniques presents it's own set of compromises. Mode filtering by bend radius requires a small radius fiber bobbin, resulting in increased heat density and mode filters introduce extra loss, resulting in reduced efficiency. LMA fiber structures have small numerical aperture and high bend loss making them more prone to perturbations. LMA fiber lasers have beam qualities substantially greater than the diffraction limit at $M^2=1.3$ or greater. Furthermore it is not clear how a polarization-maintaining core could be realized with these structures or how these structures would perform in the presence of thermally induced index changes at high power. It is also likely that the more complex LMA design with different dopants will be more susceptible to non-linear effects or damage than a conventional step index design.

In the subject system, to avoid these problems one simply increases the operating wavelength which allows for larger size cores to support single fundamental mode operation, thereby maintaining the inherent high beam quality of fiber lasers. The relationship between core diameter and number of modes supported in the core is expressed by the fiber "V" number. For a step-index fiber the V-number is given by:

$$V=2\pi\alpha(n_1^2-n_2^2)^{1/2}/\lambda$$

For a single mode core, V<2.405 and hence increasing the wavelength leads to a linear increase in the single mode core radius, $\alpha$ with a corresponding quadratic reduction in intensity. To increase the operating wavelength one uses Thulium (Tm) instead of Ytterbium (Yb) as the lasing ion in the active core. Thulium has been demonstrated to lase in fibers over a 300 nm range spanning from 1800 nm to 2100 nm or roughly twice the wavelength of Yb which operates from 1030 to 1150 nm. This 2× increase in wavelength allows the core to be two times larger which leads to a mode area four times greater and a corresponding 4× decrease in intensity. A Thulium fiber laser is suitable for atmospheric transmission as a number of atmospheric transmission windows lie within the Tm emission range.

The two most important fiber non-linear optical processes are inelastic stimulated scattering processes known as Stimulated Brillouin Scattering (SBS) and Stimulated Raman Scattering (SRS) and the generated scattered light is known as the Stokes wave. They differ in that optical phonons are created in SRS, whereas acoustic phonons are created in SBS. Both of these processes exhibit an intensity threshold that is a function of the fiber effective length (approximately equal to the inverse of the attenuation coefficient, $1/\alpha$) and non-linear gain coefficient, g, as given in the following relation:

$$I_{th} \approx k\alpha/g,$$

where k=16 for SRS and k=21 for SBS. SBS is particularly important since it is this effect that leads to self Q-switching of a fiber laser and subsequent optical damage. The SBS gain, g is given by:

$$g_{SBS} = \frac{\gamma^2 k^2}{c\rho c_s \Gamma_B}$$

where $k=2\pi/\lambda$, $\gamma$ is the electrostrictive constant, $\rho$ is the density, $c_s$ is the acoustic velocity and $\Gamma_B$ is the SBS line width. Since the gain is proportional to $k^2$, doubling the wavelength gives a 4× increase in SBS threshold. This combined with the intensity reduction results in an overall 16× increase of the SBS threshold at 2 μm. For SRS the gain coefficient g is given by:

$$g_{SRS} = \frac{\pi N \varpi_S}{cnm\varpi_v \Gamma_R}$$

where N is the number density, $\omega_S$ is the Stokes frequency, $\omega_v$ is the Raman frequency and $\Gamma_R$ is the Raman line width. Hence g is proportional to the Stokes frequency, $\omega_S$ which makes it inversely proportional to the Stokes wavelength. Hence doubling the wavelength gives a 2× increase in SRS threshold. This combined with the intensity reduction results in an overall 8× increase of the SRS threshold at 2 μm.

As to Thulium fiber laser performance, in comparison to Yb, very little development of the Tm-fiber laser has been done to-date. The best published result to-date by Hayward et al., at University of Southampton has been 14 W output power for a launched power of 36.5 W of 787 nm pump with a beam quality factor, $M^2<1.1$. The laser threshold was 7.6 W, the slope efficiency was 46% and the optical efficiency was 38%. The observed slope efficiency is greater than the quantum defect limited slope of 39% due to the "two-for-one" cross-relaxation excitation that has been observed in crystalline Tm lasers.

The laser uses a double-clad fiber with a 20 μm diameter, 0.12 NA core and a 200 μm diameter inner cladding. The inner cladding was coated with a low index polymer outer cladding, resulting in an inner cladding 0.49 NA. The alumino-silicate core region was fabricated by solution doping of a MCVD grown perform and the resulting Tm concentration in the core was 2.2 wt %. The pump absorption coefficient of the fiber was 4.6 dB/m at 787 nm.

A number of performance enhancements to this design are possible including use of integrated fiber Bragg grating (FBG) reflectors, optimization of the output coupling, and higher Tm concentration results in a launched power optical efficiency of 50%. If a high efficiency side-pump scheme is used, then the overall optical efficiency is as great as 40%. Assuming a laser diode efficiency of 50% then the wall-plug efficiency could approach 20%; a level similar to current technology Yb lasers.

Figure 10:
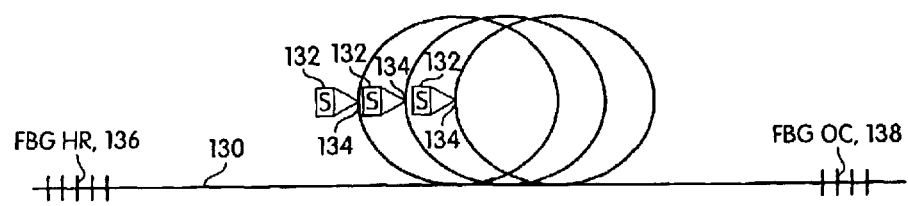
FIG. 10 is a schematic illustration of a 1-KW fiber laser using direct diode side-pumping, illustrating the use of a number of diode sources injecting light into a coiled double clad fiber at the indicated points on the coil.

A schematic of a high power side pumping Tm:fiber laser is shown in FIG. 10. It consists of a Tm-doped single-mode, double-clad fiber 130 side pumped by a number of diode laser sources 132 having their individual outputs focused on the alpha facets of respective V-grooves. As can be seen, when the fiber is coiled the sources can be lined up in a bar which crosses corresponding portions 134 of fiber 130. One end of the fiber cavity is defined by a Bragg grating (FBG) high reflector and the other end of the cavity is defined by a special pump coupler 138 which includes an FBG output coupler and output collimating optics.

The high power level will also requires a larger mode area polarization maintaining (PM) Tm-doped core. A step-index, large core PM double clad Yb fiber amplifier was recently demonstrated having a 15 μm core and an extinction ratio >15 dB. Hence this structure may be extended to the slightly larger 20 μm core of the Tm:laser.

For higher power levels it is necessary to improve the efficiency by directly diode pumping the Tm fiber laser. The pump wavelength may use either highly developed 790 nm laser diodes to pump the $^3H_6-^3H_4$ transition, or ≈1600 nm to pump the $^3F_4-^3H_6$ transition. Although 790 nm pumping is quite efficient due to a "two-for-one" cross-relaxation process at sufficiently high Tm concentrations, it is more desirable to directly pump at 1600 nm with a guaranteed 78% quantum defect. However, due to the ability to utilize an almost unlimited number of diode lasers, when using the subject side pumping technique one can use direct 790 nm laser diode pumping of a double clad fiber.

An analysis of thermal effects in high power fiber lasers was recently published by Brown and Hoffman. In this analysis, they calculate the temperature gradient in a Yb double clad fiber laser structure in order to calculate the role of thermally-induced stress and lensing in high power fiber lasers. Their results show that the temperature gradients are small, resulting in very low values of stress and lensing. However due to the poor thermal conductivity and heat transfer in the uncooled (static air) fiber geometry, the actual core temperatures can be very high and even approach the melting point at the high pump powers necessary for a 1-KW laser. This also has senous implications for laser efficiency, since these high temperatures will create a significant ground state population and hence higher loss in quasi-three level lasers such as Yb, Er and Tm. Thus a high power fiber laser requires adequate cooling to reduce the core temperature and in this case, the thermal gradient may increase significantly as the heat flow through the fiber walls is improved. In order to provide better cooling, a "D-shaped" fiber is used where the flat side is in contact with a cooled surface. This structure also helps to increase the double clad fiber pump absorption.

The subject Thulium laser operates at ~33% conversion efficiency. Hence, a 1-KW Tm fiber laser requires ~3 KW of pump power. The direct coupling modified V-groove scheme discussed earlier permits only one pump delivery per absorption length. Any more frequently than this and the V-grooves will present loss to the pump previously injected. Any less frequently and unpumped regions of the fiber will present loss in the laser resonator due to ground state absorption.

Figure 11:
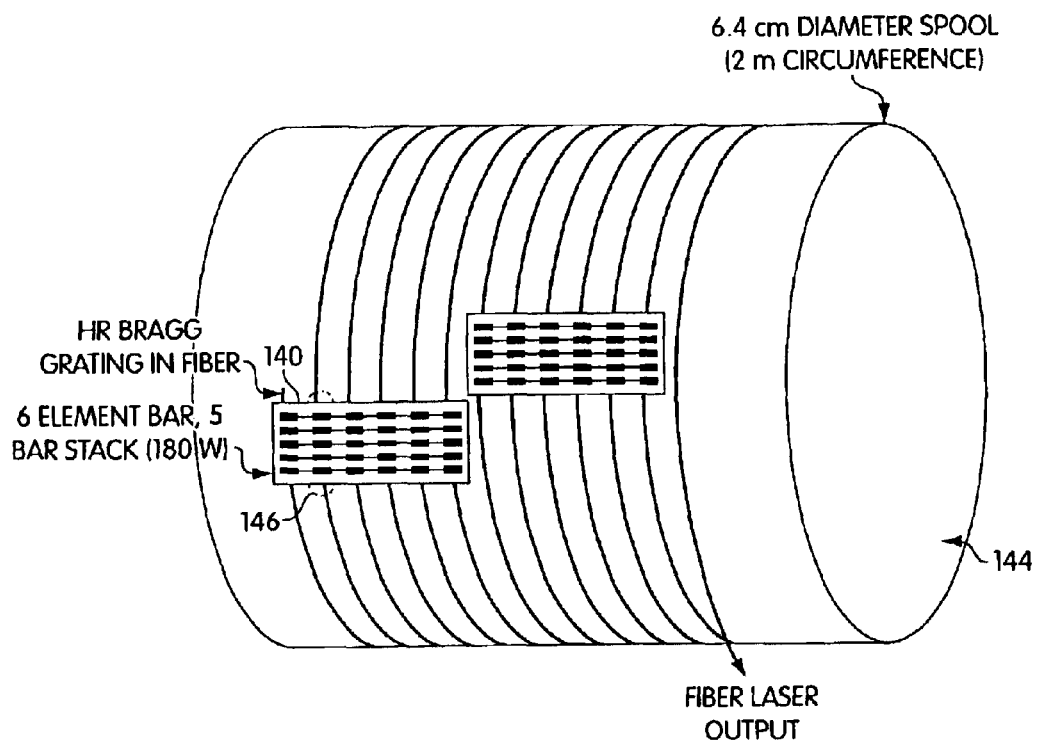
FIG. 11 is a diagrammatic illustration of a thulium fiber laser utilizing 30 watts of diode pump per absorption length along with the subject V-groove coupling technique, with the pump diodes arrayed in a multi-element bar.
Figure 12:
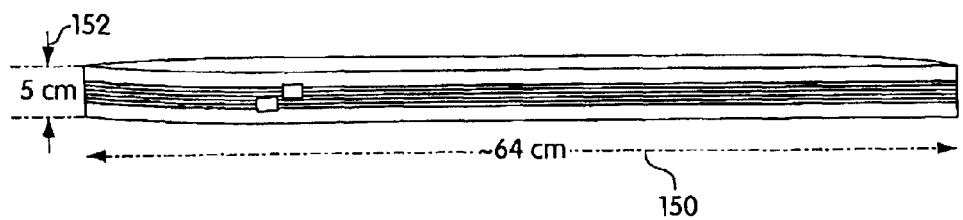
FIG. 12 is a side view of the coiled fiber laser of FIG. 11, illustrating the aspect ratio of the spool carrying the coiled fiber, with the spool having a relatively large diameter but a relatively small height; and, FIG. 13 is a diagrammatic illustration of the first two stages of a 1-KW thulium fiber laser utilizing free-space coupling through germanium windows used to suppress Q pulse switch generation.

Nevertheless, assuming 30W of pump delivered by a 5-groove input, and a pump absorption length of ~2 meters (given 4.6 dB/m or 1.06 m⁻¹ absorption coefficient), 330W of pump requires 11 absorption lengths, or a 22 meter long thulium fiber laser. This is shown schematically in FIG. 11. The first column 140 of diode elements in an array of 6-element, 5-bar stacks 141 couple the diode pump into a double clad fiber 142 via modified V-grooves. After the fiber passes once around a 2 m circumference spool 144, it is then aligned to the next column 146 of emitters in the array. Recall that the emitters do not have to be closely spaced, since each is individually coupled into the fiber. This minimizes the heat density in the diode arrays. Coupling two of these arrays delivers ~360W of pump power to the fiber. At the 90% coupling efficiency obtainable with V-grooves, one can launch >300W of pump into the 22 m meter long fiber. Note that as can be seen from FIG. 12, the diameter 150 while large at 64 cm, has a height 152 of only 5 cm.

The need for a modified pump geometry is particularly apparent when considering the 1-KW system design. Building such a laser using pigtailed 2W single emitters requires ~1800 emitters and becomes prohibitively large and complex. Similarly, using 30 pigtailed FAPs or V-groove arrays will require ~100 taps into the fiber. If the V-grooves are applied directly to the double clad fiber, only twenty 180W arrays need to be coupled, but the required fiber length is 220 m. The fiber taps can be added more frequently, reducing the fiber length, but the absorbed power density could become prohibitively large. For instance, 300W absorbed in a 22 m long, 10 $\mu$m core radius fiber represents an absorbed power density of 430MW/cm$^3$. Half of that or more is dissipated as waste heat, and as such some active heat extraction needs to be implemented to keep the fiber core from melting.

In order to reduce the heat density in the fiber core of the 1-KW system, the fiber should be made as long as possible, provided that the length-dependent non-linear effects (such as stimulated Brillouin scattering, or SBS) can be avoided. SBS is manifested as resonator-flux dependent loss, and can result in generation of very intense Q-switched pulses. Since the Thulium laser is operating at 2 $\mu$m, one includes simple optical limiters periodically along the fiber laser.

Figure 13:
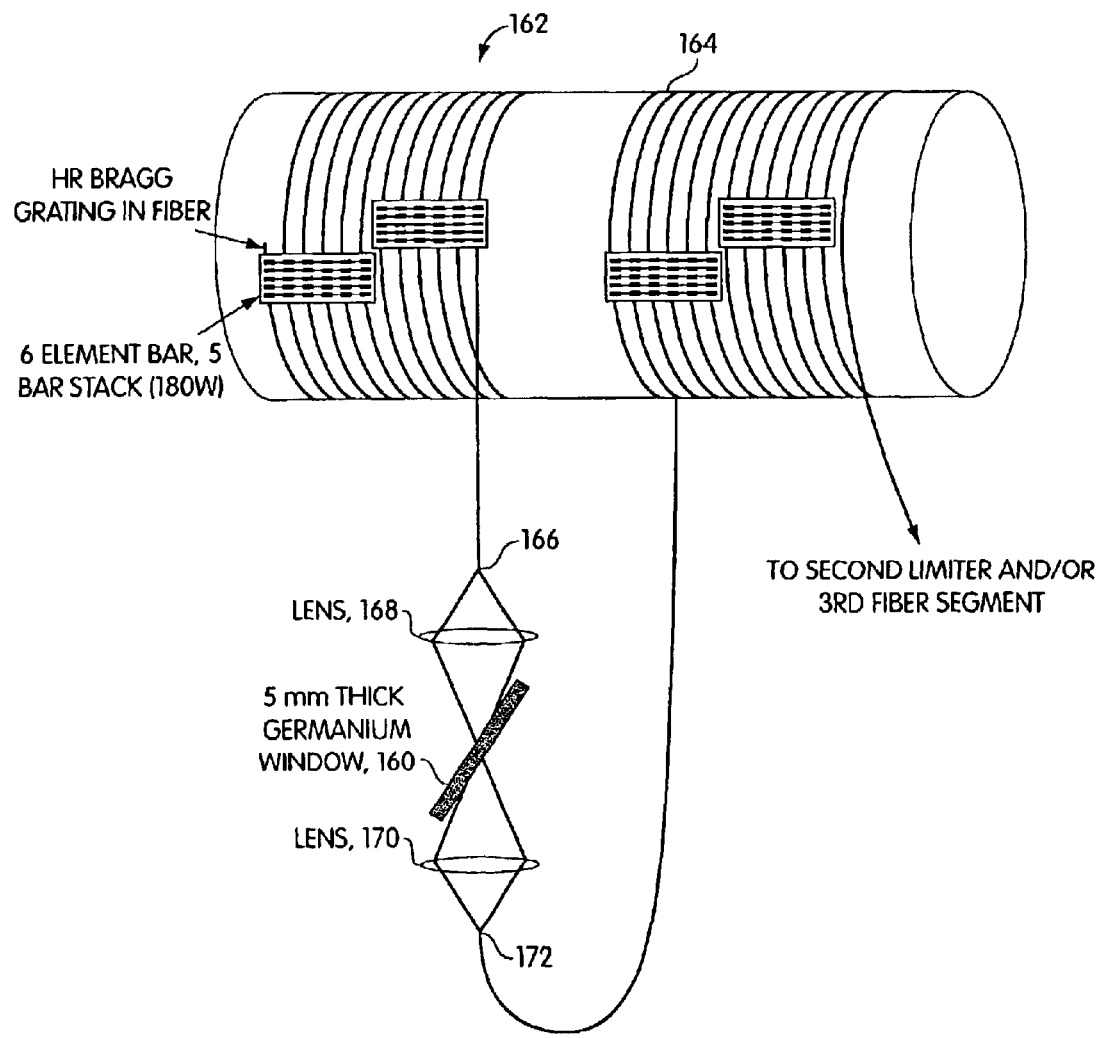

Specifically, and as illustrated in FIG. 13, thin (5 mm) germanium windows 160 are placed in the laser resonator (either at Brewster's angle, or AR-coated and at normal incidence) and are transparent to the CW laser. Intense pulses can be eliminated as the germanium will instantaneously quench lasing as the pulses are generated. The two-photon absorption process is instantaneous, so the germanium window will not retain any residual loss, rather it will act as a noise suppressor.

A 1-KW fiber laser system with germanium optical limiters is achieved by putting ten 100W lasers in series with free-space couplings through optical limiters placed as often as in between each 100W stage. However, the number should be minimized to reduce the associated coupling losses. As illustrated in FIG. 13, two stages 162 and 164 are shown in which a fiber end 166 of stage 162 is imaged onto germanium window 160 by focusing optics 168. Optics 170 focuses the light through window 160 onto end 172 of the fiber for stage 164. In this manner the stages can be coupled together to create the 1-KW laser using the modified V-groove pumping technique described herein.

Having now described a few embodiments of the invention, and some modifications and variatous thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. Apparatus for pumping a high power fiber laser having a fiber with a doped core, comprising:
   a number of pumping sources;
   optics for focusing the light from said pumping sources to points within said fiber; and,
   a series of closely spaced V-grooves in the side of said fiber pointing towards respective pumping sources, said grooves spaced by less than an absorption length, each of said grooves having an alpha facet angled to reflect pumping light down said fiber in a predetermined direction, said V-grooves being positioned such that the point to which a pumping source is focused lies on an alpha facet of an associated V-groove, such that light from a number of pumping sources is reflected down said fiber around subsequent V-grooves and is combined to pump the core of said fiber.

2. The apparatus of claim 1, wherein selected V-grooves downstream of a first V-groove have beta facets which are sloped to assure total internal reflection of any light reflected by an upstream alpha facet onto a downstream beta facet, whereby downstream V-grooves do not interfere with upstream V-grooves, thus to permit pumping from multiple pumping sources.

3. The apparatus of claim 2, wherein said fiber includes a double clad fiber having an inner cladding surrounding said core and an outer cladding, said grooves being formed in the outer surface of said inner cladding.

4. The apparatus of claim 2, wherein said core is doped with a rare earth element.

5. The apparatus of claim 4, wherein said rare earth element is Thulium.

6. The apparatus of claim 1, wherein the V-grooves are made by etching said fiber with $CO_2$ laser radiation.

7. The apparatus of claim 3, wherein the angle that said beta facet makes with the center line of said fiber is less than 3°.

8. A method of pumping a high power fiber laser made from a double clad fiber having a core, an inner cladding layer and an outer cladding layer, comprising the steps of:
   providing a number of closely spaced modified V-grooves in a surface of the inner cladding so as to define a first V-groove and subsequent downstream V-grooves, the downstream V-grooves having a beta facets which are sloped so as not to reflect light from an upstream facet so that light reflected by the beta facet impinges on the outer surface of the inner core at an angle less than the critical angle such that upstream pumping light introduced at one V-groove moves by a subsequent V-groove, whereby there is total internal reflection of pumping light introduced into the inner cladding, each V-groove having an alpha facet for reflecting pumping light in the downstream direction; and,
   focusing pumping light from a number of independent pumping sources onto the alpha facets of the V-grooves, whereby a number of independent pumping sources may be used to pump the core, thus to combine the pumping energy from a number of independent pumping sources sufficient to provide for a high power fiber laser output.

9. The method of claim 8, wherein the pumping sources are direct coupled to the fiber.

10. The method of claim 8, wherein the pumping sources are remote from the fiber and have the outputs thereof coupled to the fiber through the use of optical filters.

11. The method of claim 10, wherein the optical fiber are multimode fibers.

12. The method of claim 8, wherein the double clad fiber core is doped with a rare earth element.

13. The method of claim 8, wherein the laser output exceeds 1-KW.

14. The method of claim 13, wherein the combined pumping power from the pumping source exceeds 2-KW.

15. A high powered fiber laser, comprising:
   a double clad fiber having a core, an inner cladding for said fiber and an outer cladding for said fiber;
   a plurality of modified V-grooves closely spaced along a surface of said inner cladding, each of said modified V-grooves having an alpha facet, modified V-grooves downstream of a first modified V-groove having beta facets sloped to assure total internal reflection of pumping light reflected from an upstream alpha facet onto a downstream beta facet such that light introduced at one modified V-groove goes by a subsequent modified V-groove;

a substantially identical plurality of pumping sources having pumping light focused on alpha facets of respective modified V-grooves;

an HR Bragg grating in the fiber upstream of said first modified V-groove; and, an output coupler Bragg grating downstream of the last of said modified V-grooves, said pumping sources collectively providing sufficient pumping power.

16. The laser of claim 15, wherein said fiber is spooled and wherein said modified V-grooves on successive turns are positioned adjacent each other.

17. The laser of claim 15, wherein said plurality of pumping sources are spaced along a bar, said bar being located adjacent said fiber such that each of said pumping sources overlies a different V-groove.

18. The laser of claim 15, wherein said fiber is divided into sections, the output of one of said sections being coupled by a coupler to the input of a succeeding section.

19. The laser of claim 18, wherein said coupler includes an optical limiter.

20. The laser of claim 19, wherein said optical limiter includes a germanium window and optics for focusing said output onto said window, thus to quench Q-switched pulses so as to act as a noise suppressor.

* * * * *